US006973959B1

(12) United States Patent
Claverie et al.

(10) Patent No.: US 6,973,959 B1
(45) Date of Patent: Dec. 13, 2005

(54) HEAT EXCHANGER FOR COOLING A MOTOR VEHICLE EXHAUST GASES

(75) Inventors: Patrick Claverie, Clamart (FR); Arnaud Vitel, La Garenne-Colombes (FR)

(73) Assignee: Peugeot Citroen Automobiles SA, Neuilly-sur-Seine (FR)

( * ) Notice: Subject to any disclaimer, the term of this patent is extended or adjusted under 35 U.S.C. 154(b) by 323 days.

(21) Appl. No.: 10/130,676

(22) PCT Filed: Nov. 21, 2000

(86) PCT No.: PCT/FR00/03235

§ 371 (c)(1), (2), (4) Date: Aug. 15, 2002

(87) PCT Pub. No.: WO01/38702

PCT Pub. Date: May 31, 2001

(30) Foreign Application Priority Data

Nov. 22, 1999 (FR) .................................. 99 14662

(51) Int. Cl.[7] ............................ F01N 3/02; F01N 3/08; F01N 3/05

(52) U.S. Cl. .......................... 165/51; 165/41; 165/135; 237/12.3 A; 181/265; 181/266; 181/269; 181/282; 60/298; 60/320

(58) Field of Search ............................ 165/51, 52, 135, 165/41; 237/12.3 A; 181/265, 266, 269, 181/282; 60/298, 320, 321

(56) References Cited

U.S. PATENT DOCUMENTS 929,656 A * 8/1909 Coles (Continued)

FOREIGN PATENT DOCUMENTS

FR 617828 2/1927

(Continued)

OTHER PUBLICATIONS

PCT Search Report, PCT/FR00/03235, Mar. 26, 2001, p. 1-4.

*Primary Examiner*—John K. Ford
(74) *Attorney, Agent, or Firm*—Connolly Bove Lodge & Hutz LLP

(57) ABSTRACT

A heat exchanger for cooling motor vehicle exhaust gases, which heat exchanger is to be fitted into an exhaust line of the vehicle and having at least three tubes in contact by way of their outer walls with cooling air, in which the exhaust gases are brought to circulate. The exchanger has an outer casing of sheet metal that is substantially cylindrical in shape and through the lateral wall of which there pass openings, in which casing the tubes are fixed by holding means in substantially parallel arrangements inside the casing, a pipe for the admission of exhaust gases into the casing of the heat exchanger which pipe is connected to the exhaust line upstream of the heat exchanger, an exhaust gas evacuation pipe connected to the exhaust line downstream of the heat exchanger, and exhaust gas distribution means arranged inside the casing of the heat exchanger, the exhaust gas distribution means allowing the exhaust gases to be passed from the admission pipe to the evacuation pipe along a path that passes in succession, in an axial direction, through each of the tubes of the plurality of tubes along their entire length. There are also at least four collectors delimited, inside the metal casing of the heat exchanger by two axial-end cupels or outer cupels that are arranged transversely and close the axial ends of the metal casing of the heat exchanger.

7 Claims, 3 Drawing Sheets

U.S. PATENT DOCUMENTS

| | | | | |
|---|---|---|---|---|
| 1,681,256 | A | * | 8/1928 | Raleigh |
| 1,762,465 | A | * | 6/1930 | Bovey |
| 1,882,085 | A | * | 10/1932 | Nelson |
| 1,913,573 | A | * | 6/1933 | Turner |
| 2,200,397 | A | * | 5/1940 | Monson |
| 3,127,200 | A | * | 3/1964 | Sayag |
| 3,605,389 | A | | 9/1971 | Butler |
| 4,381,045 | A | * | 4/1983 | Buchwalder |
| 5,048,287 | A | * | 9/1991 | Howe et al. |
| 5,314,009 | A | * | 5/1994 | Yates et al. |

FOREIGN PATENT DOCUMENTS

| | | | |
|---|---|---|---|
| FR | 783570 | * | 7/1935 |
| GB | 1377501 | | 12/1974 |
| WO | WO 89/11024 | | 11/1989 |

* cited by examiner

HEAT EXCHANGER FOR COOLING A MOTOR VEHICLE EXHAUST GASES

FIELD OF THE INVENTION

The invention relates to a heat exchanger for cooling motor vehicle exhaust gases.

BACKGROUND OF THE INVENTION

It may be necessary to cool motor vehicle exhaust gases circulating in an exhaust line that is connected to the engine via exhaust pipes and in which there may be arranged, for example, one or more silencers and/or one or more exhaust gas treatment devices.

In the case of an exhaust line comprising one or more treatment devices allowing the exhaust gases to be cleaned, it may be necessary to cool the circulating gases before they enter the treatment device in order that the temperature of the gases is always perfectly adapted to the operating conditions of the cleaning unit or alternatively in order to avoid destroying or damaging one or more components of the treatment device by the effect of heat.

More generally, it may be necessary to cool the exhaust gases of an engine in order to avoid damaging the elements constituting the exhaust line.

The fitting of a heat exchanger device into the exhaust line, for example upstream of an exhaust gas cleaning unit, has therefore been considered.

The most simple solution consists in the use of a single tube of great length, the conduction of the tube and the convection associated with the flow of air around the tube being used to remove energy. The disadvantage of that solution is that it may result in the use of tubes of very great length, leading to problems with installation beneath the floor of the motor vehicle.

There has not hitherto been known a heat exchanger device that is simple and compact in construction, is fitted into the exhaust line of a motor vehicle and allows the exhaust gases circulating in the exhaust line to be cooled effectively by means of air in contact with the wall of a pipe in which the exhaust gases are flowing.

In FR-A-783.570 there is described a silencer for a motor vehicle exhaust line, having a plurality of bodies, for example two bodies separated from one another by an intermediate space and each constituted by an assembly of tubes that are parallel to one another and the total cross-section of which allows throttling of the flow of exhaust gases inside the silencer. Such a device permits a certain cooling of the exhaust gases to be carried out. However, the length of the path of the gases inside each of the bodies of the silencer is limited to the length of the tubes arranged in parallel.

The object of the invention is, therefore, to propose a heat exchanger for cooling motor vehicle exhaust gases, which heat exchanger is to be fitted into an exhaust line of the vehicle, comprising at least one plurality of tubes in contact by way of their outer walls with cooling air, in which the exhaust gases are brought to circulate, comprising an outer casing of sheet metal that is substantially cylindrical in shape and through the lateral wall of which there pass openings, in which casing tubes of the plurality of tubes are fixed by holding means in substantially parallel arrangements, inside the casing, a pipe for the admission of exhaust gases into the casing of the heat exchanger, which pipe is connected to the exhaust line upstream of the heat exchanger, an exhaust gas evacuation pipe connected to the exhaust line downstream of the heat exchanger, and exhaust gas distribution means arranged inside the casing of the heat exchanger, the heat exchanger, which is simple to produce and compact in form, allowing effective cooling of the exhaust gases, the intensity of which can easily be adjusted.

To that end, the exhaust gas distribution means allowing the exhaust gases to be passed from the admission pipe to the evacuation pipe, along a path that passes in succession, in an axial direction, through each of the tubes of the plurality of tubes, along their entire length, are constituted by collectors delimited, inside the metal casing of the heat exchanger, by two axial-end cupels or outer cupels that are arranged transversely and close the axial ends of the metal casing of the heat exchanger, and by a plurality of inner cupels that are each arranged along the entire inner transverse cross-section of the metal casing, at a distance from the axial ends of the metal casing of the heat exchanger, and through each of which there passes at least one opening for the passage and fixing of a tube of the plurality of tubes, each of the tubes of the plurality of tubes being fixed at one of its ends in a first inner cupel and at its other end in a second inner cupel, each of the collectors being delimited inside the lateral wall of the metal casing by a first cupel, which may be an outer cupel or an inner cupel, and by a second cupel, which is an inner cupel.

BRIEF DESCRIPTION OF THE FIGURES

For the purposes of better understanding of the invention, a heat exchanger according to the invention, which is used in a motor vehicle exhaust line, will now be described by way of example with reference to the attached Figures.

DETAILED DESCRIPTION OF THE INVENTION

Figure 1:
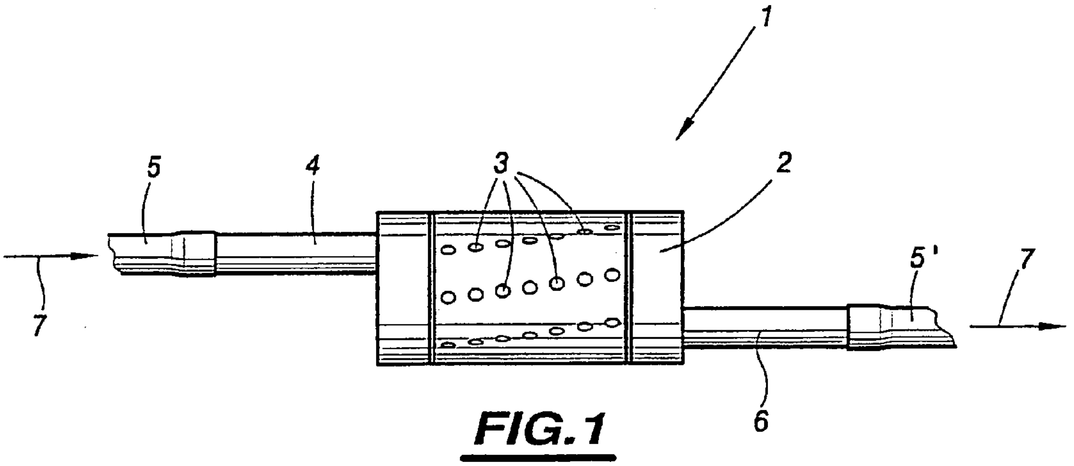
FIG. 1 is a side elevation of part of a motor vehicle exhaust line comprising a heat exchanger according to the invention.

FIG. 1 shows the heat exchanger according to the invention, designated generally by the reference numeral 1, which comprises a sheet metal casing 2 through the lateral wall of which there pass openings 3 over a portion of its length, an exhaust gas admission pipe 4 connected to a part 5 of the exhaust line of a motor vehicle upstream of the heat exchanger 1, from the point of view of the direction of flow of the exhaust gases along the line indicated by the arrows 7, and an exhaust gas evacuation pipe 6 connected to a part 5' of the motor vehicle exhaust line downstream of the heat exchanger 1, from the point of view of the direction of flow of the gases indicated by the arrows 7.

The upstream part 5 of the exhaust line, which is connected at one of its ends to the pipe 4 for admitting the exhaust gases into the casing 2 of the heat exchanger 1, has a second end that is connected to the exhaust pipes of the motor vehicle engine.

The downstream part 5' of the exhaust line may be connected, for example, to one or more silencers and/or to a device for the cleaning treatment of the exhaust gases.

The heat exchanger 1, which is fitted between the parts 5 and 5' of the motor vehicle exhaust line, must be capable of being easily accommodated beneath the floor or in a subfloor area of a motor vehicle.

Accordingly, the sheet metal casing 2 of the heat exchanger 1 must be compact in form and must have dimensions that are as small as possible.

The heat exchanger according to the invention, which will be described in greater detail with reference to the Figures in their entirety, makes it possible to accommodate in a compact metal casing means for circulating the gases inside the casing in thermal contact with cooling air, along a path of great length. It is thus possible to achieve very effective cooling of the gases between the upstream part and the downstream part of the exhaust line.

Figure 2:
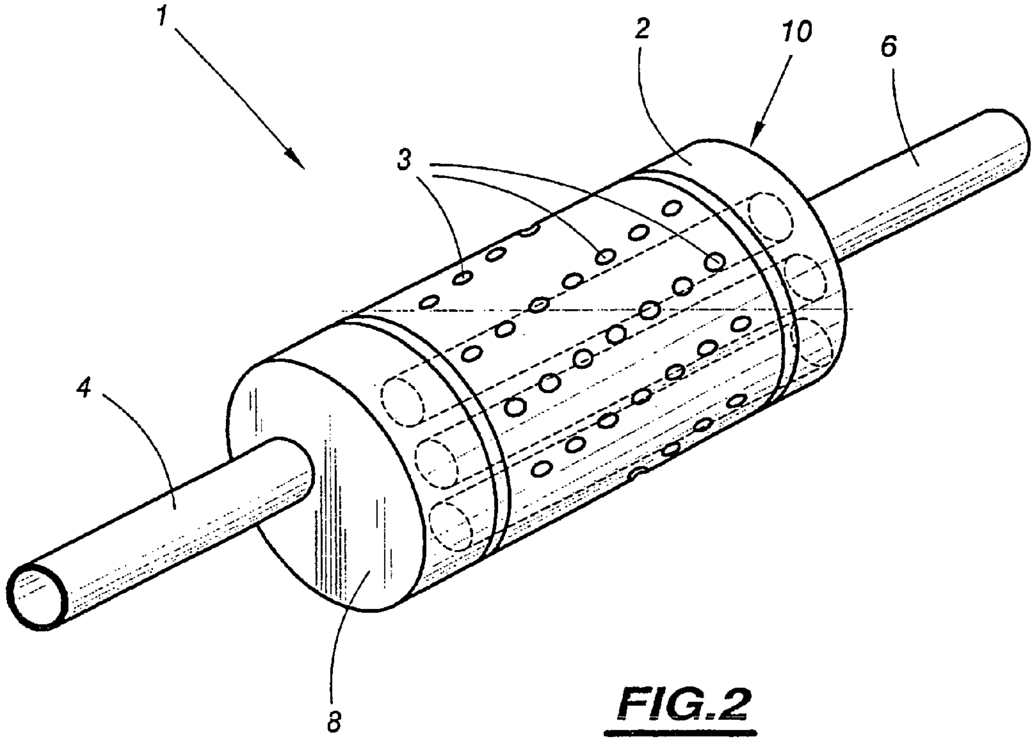
FIG. 2 is a perspective view of the heat exchanger according to the invention.

As will be seen especially in FIG. 2 and in FIGS. 4A to 4F, the metal casing 2 of the heat exchanger 1 has the general form of a cylinder having an oblong transverse cross-section, for example a cross-section that is substantially elliptical in shape. In fact, the shape and dimensions of the casing of the heat exchanger 1 are analogous to those of the metal casing of a silencer in a motor vehicle exhaust line, of the conventional type. That shape, which may be complex in some cases, must allow the exchanger according to the invention to be accommodated easily in the sub-floor area of a motor vehicle.

The sheet metal casing 2 has a lateral wall that is closed at its upstream end by a first metal plate of substantially elliptical shape 8 fixed to the upstream end of the lateral wall of the metal casing 2 by crimping along an outer edge. An opening 9, which may be circular or oblong, passes through the metal plate 8, which constitutes a first outer cupel of the metal casing 2, in which opening there is engaged and fixed by crimping or welding an end of the exhaust gas admission pipe 4, the cross-section of which, which corresponds in shape to the opening, has been shown in FIG. 4A.

The metal casing 2 also has a second, downstream metal end wall 10 of oblong shape, which is fixed by crimping along an outer edge to the downstream end part of the sheet metal lateral wall of the casing 2 of the heat exchanger.

The shape of the transverse cross-section of the metal casing 2 and hence of the end walls is generally oblong. In certain cases, however, according to the space available beneath the floor of the vehicle, it may be necessary to resort to more complex shapes.

An opening 11, which may be circular or, optionally, oblong, passes through the downstream end wall 10, or downstream outer cupel 10, of the metal casing, in which opening 11 there is fixed the exhaust gas evacuation pipe 6.

Inside the sheet metal casing 2 of the heat exchanger 1, the flow of gases is channelled by tubes 12*a*, 12*b* and 12*c*, the cross-sections of which have been shown in FIGS. 4C to 4F.

In the case of the embodiment of the heat exchanger according to the invention that has been shown in the Figures, three exhaust gas flow tubes are used, but it would be possible, as will be explained hereinbelow, to use a larger number of tubes.

The tubes 12*a*, 12*b* and 12*c* are fixed inside the casing 2, in parallel arrangements, by means of inner cupels 14*a*, 14*b*, 14*c* and 14*d*, which are arranged according to the inner transverse cross-section of the sheet metal casing 2.

Each of the cupels 14*a*, 14*b*, 14*c*, 14*d* is constituted by a sheet metal plate having the shape of the cross-section of the casing 2 and each having an edge 13*a*, 13*b*, 13*c* and 13*d*, respectively, which is bent through 90° relative to the plane of the metal plate and by means of which the cupel is attached and fixed by crimping or welding to the inside of the sheet metal casing 2.

A first inner cupel 14*a* and a second inner cupel 14*b* are arranged one after the other in the direction of flow of the exhaust gases, in an intake portion or upstream portion of the metal casing 2.

A third inner cupel 14*c* and a fourth inner cupel 14*d* are arranged in succession in the direction of flow of the gases, in a downstream portion of the metal casing 2 closed by the outer cupel 10.

The openings 3 passing through the lateral wall of the sheet metal casing 2 are distributed over the lateral wall, in a central portion of the lateral wall, between its upstream portion and its downstream portion, that is to say between the second and third inner cupels 14*b*, 14*c*.

The first outer cupel, or upstream cupel 8, delimits a first collector 15*a* with the first inner cupel 14*a*. The first and second inner cupels 14*a*, 14*b* delimit between them a second collector 15*b*. The third and fourth inner cupels 14*c* and 14*d* delimit between them a third collector 15*c*. Finally, the fourth inner cupel 14*d* and the second outer cupel, or downstream cupel 10, delimit between them a fourth collector 15*d*.

As will be seen in FIGS. 4C, 4D, 4E and 4F, openings for the fixing of the ends of the exhaust gas channelling tubes 12*a*, 12*b* and 12*c* pass through the inner cupels 14*a*, 14*b*, 14*c* and 14*d*.

The inner cupels 14*a*, 14*b* and 14*c* each comprise an opening for the passage and fixing of the tube 12*a*. Each of the inner cupels 14*b* and 14*c* comprises openings for the passage and fixing of the tube 12*b*.

Finally, each of the inner cupels 14*b*, 14*c* and 14*d* comprises an opening for the passage and fixing of the tube 12*c*.

The tubes 12*a*, 12*b* and 12*c* are engaged and fixed in the inner cupels by means of their end portions, in such a manner that the first tube 12*a* opens at one of its ends into the collector 15*a*, into which the exhaust gas admission pipe 4 also opens, and, at its other end, into the collector 15*c*.

The second tube 12*b* opens at one of its ends into the collector 15*b* and at its other end into the collector 15*c*.

Finally, the third tube 12*c* communicates by one of its ends with the collector 15*b* and, by its other end, with the collector 15*d*, into which the evacuation pipe 6 for the cooled exhaust gases also opens.

Figure 3:
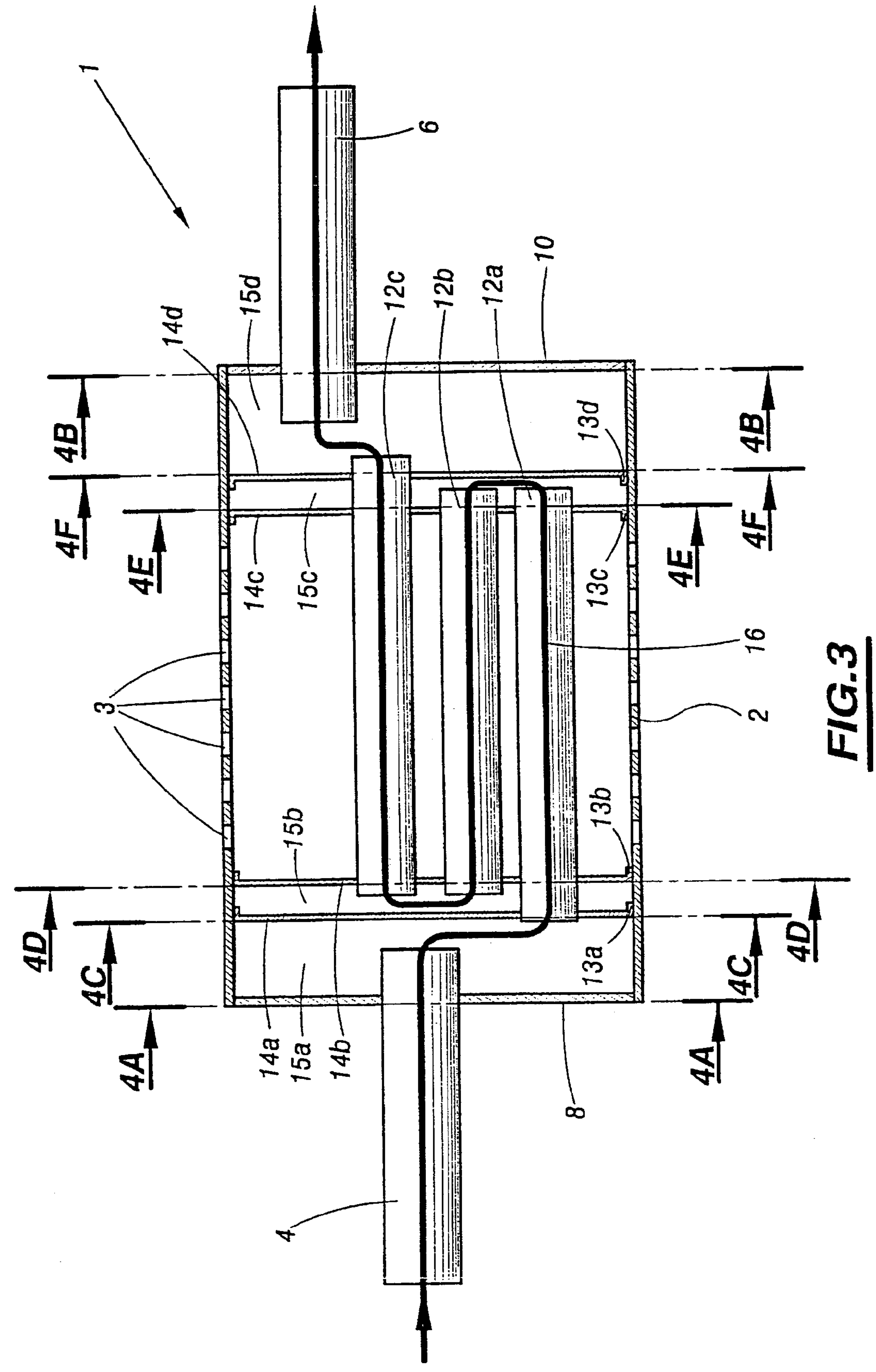
FIG. 3 is an axial cut away view of the heat exchanger.
Figure 4A:
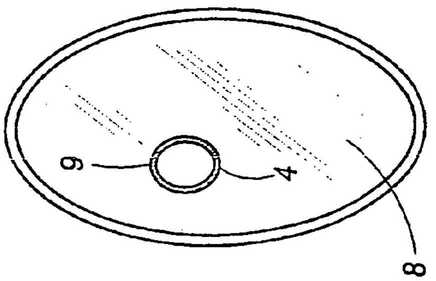
FIG. 4A is a sectional view taken along section line 4A—4A of FIG. 3.
Figure 4B:
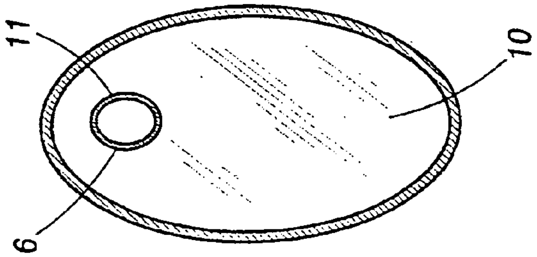
FIG. 4B is a sectional view taken along section line 4B—4B of FIG. 3.
Figure 4C:
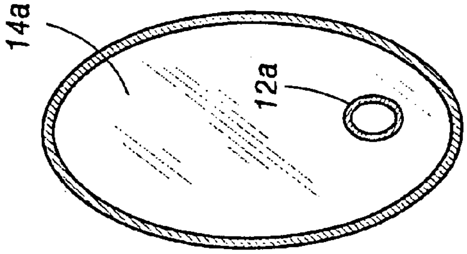
FIG. 4C is a sectional view taken along section line 4C—4C of FIG. 3.
Figure 4D:
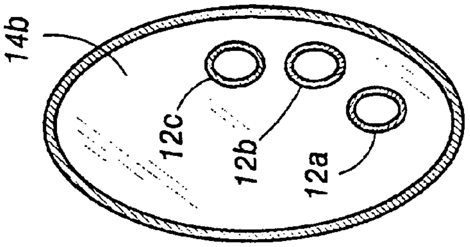
FIG. 4D is a sectional view taken along section line 4D—4D of FIG. 3.
Figure 4E:
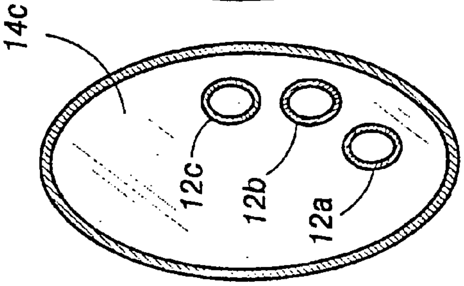
FIG. 4E is a sectional view taken along section line 4E—4E of FIG. 3.
Figure 4F:
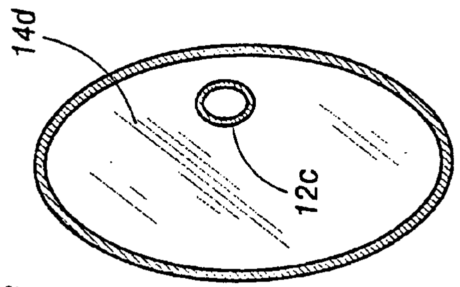
FIG. 4F is a sectional view taken along section line 4F—4F of FIG. 3.

FIG. 3 shows, in the form of a zig-zag line 16 and of arrows, the path of the exhaust gases inside the metal casing 2 of the heat exchanger, between the gas admission pipe 4 and the evacuation pipe 6 for the cooled exhaust gases.

It will be seen that the hot exhaust gases introduced into the first collector 15*a* via the admission pipe 14 pass through the tubes 12*a*, 12*b* and 12*c* in succession, in the axial direction and along their entire length, the exhaust gases passing from the first to the second tube inside the third collector 15*c* and from the second to the third tube 12*b*, 12*c* inside the second collector 15*b*.

The gases flow alternately, in one direction and in the other, along the axial direction of the tubes, which are themselves substantially parallel to the axial direction of the cylindrical casing 2 of the heat exchanger 1.

Between the second inner cupel 14*b* and the third inner cupel 14*c*, the lateral wall of the tubes 12*a*, 12*b* and 12*c* is in contact with atmospheric air, which enters the casing 2 of the heat exchanger through the openings 3 and circulates by convection inside the central portion of the casing 2, in contact with the outer surface of the tubes.

The exhaust gases flowing inside the tubes are therefore cooled by heat exchange with the circulating atmospheric air.

The path of the gases in the central portion of the heat exchanger, in thermal contact with the cooling air, has a length that is only slightly less than three times the length of the metal casing 2, it being possible for the first end (upstream) zone of the casing between the cupels 8 and 14*b* and the second end (downstream) zone between the cupels 14*c* and 10 to have a smaller length in the axial direction.

Of course, the exhaust gases are entirely separate from the cooling air; the cupels and the metal casing, which is without openings in its end zones, ensure that the collectors are closed completely tightly; the tubes are fixed at their ends in a tight manner in the openings passing through the inner cupels. In the central zone of the metal casing 2 swept by cooling air, the heat exchange wall of the tubes does not have any openings.

The device according to the invention therefore enables the exhaust gases to be circulated separately but in thermal contact with cooling air, along a path having a length substantially greater than the length of the heat exchanger, in the direction of the exhaust line.

In the case of a heat exchanger comprising three inner tubes, as has just been described, the length of the path of the gases is only slightly less than three times the length of the heat exchanger.

More generally, it would be possible to envisage using any number n of tubes, making it possible to obtain an exhaust gas path in contact with the cooling air that has a length only slightly less than n times the length of the heat exchanger.

In all cases, it is necessary to provide an upstream gas admission collector, a downstream gas evacuation collector, and intermediate collectors in a sufficient number to ensure that the exhaust gases pass into each of the tubes of the heat exchanger in succession.

In order for the gases to pass into n tubes of the exchanger in succession, it is necessary to use n−1 intermediate distribution collectors.

Ultimately, for a heat exchanger having n tubes, it is necessary to provide 2+n1=n+1 distribution collectors.

In order to form n−1 intermediate collectors, it is, on the other hand, necessary to provide n+1 inner cupels, at least in the case where n is odd, which corresponds to the most valuable embodiments, in so far as the cooled exhaust gases thus arrive directly at the outlet end of the casing of the heat exchanger.

The various parts of the heat exchanger, namely the sheet metal casing, the exhaust gas admission pipe and evacuation pipe, the gas flow tubes and the cupels, may be produced from any metal material having good resistance to corrosion when hot by the exhaust gases and by the cooling air. Those elements may also be produced, for example, from aluminized steel, stainless steel or a chrome-containing nickel alloy.

Because the elements constituting the heat exchanger are elements of the type that are conventional in the manufacture of exhaust line components, and because the processes of forming and assembling those elements, for example by crimping or by welding, are processes that are well mastered and proven in the manufacture of exhaust lines, the heat exchanger according to the invention can be manufactured at a reasonable cost price and under good conditions of reliability, on conventional manufacturing lines.

Moreover, the device according to the invention allows effective cooling of the exhaust gases to be carried out, which may be considerable in extent, while using a heat exchanger of extremely compact form which can easily be accommodated in the exhaust line of a motor vehicle, for example in a sub-floor area of the vehicle. In order to increase the cooling capacity of the heat exchanger, the length of the gas path can be increased by using an increased number of tubes arranged in the sheet metal casing of the heat exchanger. The only limitation to the number of tubes permitting an increase in the length of the exhaust gas path is imposed by the maximum number of tubes that can be fixed inside the casing (the cross-section of which is limited in order to allow the heat exchanger to be accommodated beneath the floor of the motor vehicle). The tubes constituting the exhaust gas path must have a minimum cross-section and must be spaced out in the cross-section of the metal casing so as to allow circulation of the air that enters the metal casing through the openings in its lateral wall and circulates by convection inside the metal casing in contact with the tubes.

It is also possible to increase the cooling capacity of the heat exchanger by increasing the number and/or diameter of the holes in the casing, which has the effect of intensifying the circulation of the air around the tubes by convection.

The invention is strictly not limited to the embodiment that has been described.

Accordingly, as has been indicated above, it is possible to use a number of tubes greater than three to constitute the gas path in the heat exchanger, it being possible for that number n of tubes preferably to be odd.

It is also possible to provide additional cupels, for example in order to improve the mechanical strength of the exchanger; in particular, additional cupels can be used to ensure better maintenance of the intake and outlet tubes. It may also be of use to add one or more bellows to one or more tubes in order to compensate for the differential thermal expansion of the tubes, which also improves the strength of the device.

In order to pass the exhaust gases from one tube to the next, in the direction of the gas path, it is possible to use collectors having different forms from those which have been described, those collectors being delimited by different cupel walls. As indicated above, the use of cupels makes it possible to remain within the scope of the conventional manufacture of an element for a motor vehicle exhaust line. It would optionally be possible to use curved collectors or deflectors joining the ends of the tubes inside the casing, or any other form of collector or exhaust gas diverting device.

The outer sheet metal casing of the heat exchanger can be produced by stamping, especially by stamping out two half-shells and subsequently assembling them.

The heat exchanger according to the invention can be fitted into a motor vehicle exhaust line at any location at which it is necessary to cool the exhaust gases leaving the pipes of the motor vehicle engine. Preferably, the heat exchanger according to the invention can be located upstream of a gas treatment device, for example a device for cleaning the exhaust gases by catalyzed oxidation.

The invention is applicable to any type of motor vehicle whose exhaust gases must be lowered in temperature at any location in an exhaust line of the vehicle.

What is claimed is:

1. A heat exchanger for cooling motor vehicle exhaust gases, which heat exchanger is to be fitted into an exhaust line of the vehicle and having at least three tubes in contact by way of their outer walls with cooling air, in which the exhaust gases are brought to circulate, the exchanger comprising an outer casing of sheet metal that is substantially cylindrical in shape and through the lateral wall of which there pass openings, in which casing the tubes are fixed by holding means in substantially parallel arrangements inside the casing, a pipe for the admission of exhaust gases into the casing of the heat exchanger which pipe is connected to the exhaust line upstream of the heat exchanger, an exhaust gas evacuation pipe connected to the exhaust line downstream of the heat exchanger, and exhaust gas distribution means arranged inside the casing of the heat exchanger, the exhaust gas distribution means allowing the exhaust gases to be passed from the admission pipe to the evacuation pipe along a path that passes in succession, in an axial direction, through each of the tubes of the plurality of tubes along their entire length, at least four collectors delimited, inside the metal casing of the heat exchanger by two axial-end cupels or outer cupels that are arranged transversely and close the axial ends of the metal casing of the heat exchanger, and by at least four inner cupels that are each arranged along the entire inner transverse cross-section of the metal casing, at a distance from the axial ends of the metal casing of the heat exchanger, in which a first collector is delimited between a first outer cupel, through which there passes the exhaust gas admission pipe opening into the collector, and by a first inner cupel, a second collector is delimited between a first inner cupel and a second inner cupel, which are arranged in a first end zone of the metal casing on the side of the exhaust gas admission pipe, a third collector is delimited between a third inner cupel and a fourth inner cupel, in a second end zone of the metal casing on the side of the exhaust gas outlet pipe, and a fourth collector is delimited by a fourth inner cupel and the second outer cupel through which there passes the exhaust gas outlet pipe, and in which a first tube of the plurality of tubes passes at one of its ends through the first cupel and the second cupel and at its other end through the third inner cupel, so as to open at one of its ends into the first collector and at its other end into the third collector, a second tube of the plurality of tubes passes at one of its axial ends through the second inner cupel and at its other axial end through the third inner cupel, so as to open at its first end into the second collector and at its second end into the third collector, and the third tube of the tube assembly passes at one of its ends through the second inner cupel and at its other axial end through the third inner cupel and the fourth inner cupel, so as to open at one of its ends into the second collector and at its other end into the fourth collector.

2. A heat exchanger according to claim 1, wherein the openings in the lateral wall of the metal casing of the heat exchanger are located between the second and third inner cupels, the first and second end zones of the metal casing of the heat exchanger having no openings.

3. A heat exchanger according to claim 1, wherein the plurality of tubes comprises n tubes, n being odd, n+1 collectors delimited by two axial-end outer cupels of the metal casing, and n+1 inner cupels.

4. A heat exchanger according to any one of claims 2, 3 and 1, wherein the transverse cross-section of the metal casing, the outer cupels and the inner cupels are made of plane sheet metal and have an a generally oblong shape in order to allow the heat exchanger to be accommodated beneath a motor vehicle floor.

5. A heat exchanger according to claim 4, wherein the exhaust gas admission pipe and the exhaust gas evacuation pipe and the tubes of the plurality of tubes selectively have a circular or oblong transverse cross-section, the openings passing through the outer cupels and the inner cupels having an analogous shape for the virtually play-free engagement of the pipes and of the tubes of the plurality of tubes.

6. A heat exchanger according to claim 1, wherein the outer casing of sheet metal is produced by stamping out and assembling two half-shells.

7. A heat exchanger according to claim 1, wherein at least one bellows is added to at least one of the tubes in order to compensate for the differential thermal expansions of the tubes.

* * * * *